Aug. 1, 1961     D. W. MITCHELL     2,994,523
CALCINING OF GYPSUM
Filed Nov. 18, 1957
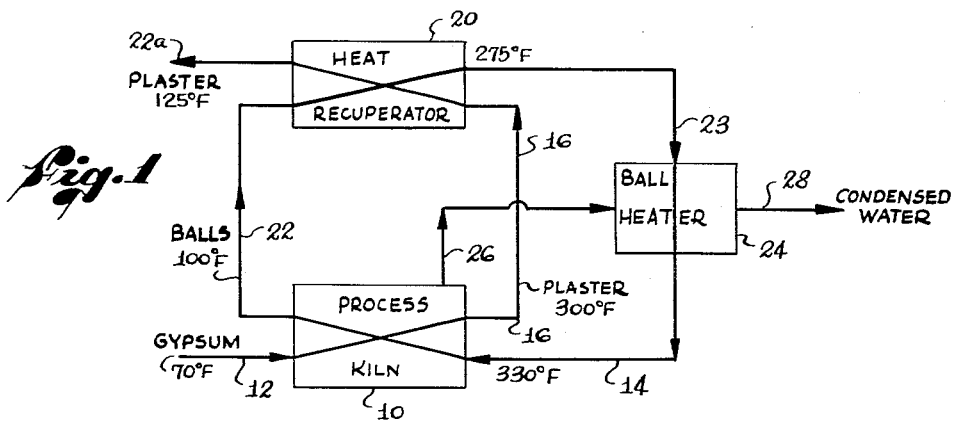
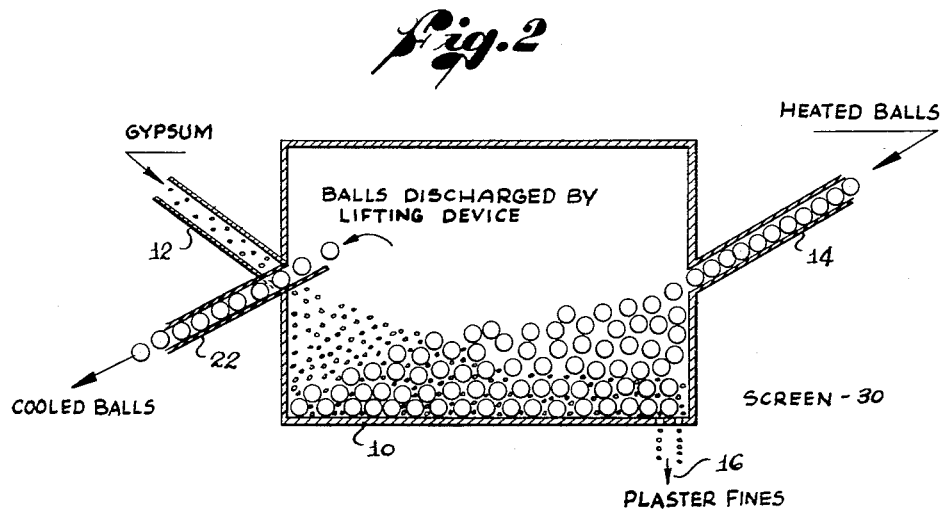
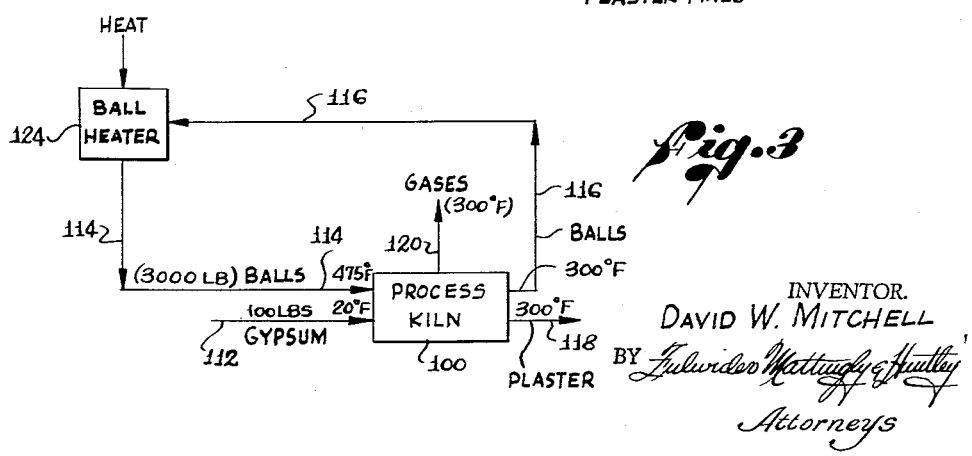
INVENTOR.
DAVID W. MITCHELL

United States Patent Office 2,994,523
Patented Aug. 1, 1961

2,994,523
CALCINING OF GYPSUM
David W. Mitchell, Kings Mountain, N.C., assignor, by mesne assignments, to The Oil Shale Corporation, Beverly Hills, Calif., a corporation of Nevada
Filed Nov. 18, 1957, Ser. No. 696,974
5 Claims. (Cl. 263—53)

This invention relates to a process for the calcining of materials, and more particularly relates to improvements in the mode of heat transfer to such materials as gypsum during the calcining process.

The calcining of calcinable materials, generally speaking, must be conducted within certain relatively narrow temperature ranges for economic and other reasons. Gypsum is an example of such a class of materials.

The calcining of gypsum, that is, the driving off of a specific amount of water of hydration in the gypsum, must be conducted within certain relatively narrow ranges of temperature, for, depending upon the temperature of the calcining, gypsum may be converted to a plaster of Paris of greatly varying properties. Too high a calcining temperature produces a relatively non-reactive product, while calcining at too low a temperature usually results in a non-uniform product having incompletely calcined portions. If a non-uniform product containing raw gypsum particles results, these detrimentally influence the setting time of the plaster and may also detrimentally affect its strength.

More specifically, the calcining of gypsum to plaster proceeds in accordance with the following chemical reaction:

$$CaSO_4.2H_2O \text{ (gypsum)} + \text{heat} \rightarrow$$
$$CaSO_4.\tfrac{1}{2}H_2O \text{ (plaster of Paris)} + \tfrac{3}{2}H_2O$$

Above a temperature of 230° F. gypsum is unstable and loses its water of hydration rapidly. Above 270° F. the gypsum loses more of its water. However, if the gypsum is heated to temperatures much above 330° F., a water-free, "dead-burned" calcium sulphate ($CaSO_4$) is produced which is unreactive and therefore undesirable. The preferable calcining temperatures therefore range between 230° F. and 330° F., and preferably are maintained between 270° and 330° F.

In the past, the calcining of gypsum has been accomplished by what is commonly termed the kettle process, this process accounting for about 75% of the total production of plaster of Paris. In brief, the kettle process is a batch process in which ground gypsum is heated batchwise in externally heated kettles, the time of calcination required being generally more than one hour. The disadvantages of the kettle process are, first, that the gypsum must be ground quite finely, and second, that it is a batch process.

The second most common process for producing plaster of Paris is a continuous process known as the rotary kiln process. The rotary kiln process utilizes a raw gypsum inlet feed having a particle size of about one inch or slightly larger. The heat-carrying medium in the rotary kiln is a hot moving gas stream. As in other kiln processes, the gas must be heated to relatively high temperatures in order that it carry sufficient heat for the calcination. This usually results in overheating of some of the gypsum. The necessary heat may be supplied by more rapidly moving but cooler gas streams, but there is a serious disadvantage to this procedure, inasmuch as the faster the gas stream, the more fines are removed from the kiln. Thus, in a usual rotary kiln process a compromise must be maintained between overheating and excessive dusting. The gypsum feed must have the fines removed therefrom, for, in addition to the problem of excessive dusting, considerable over-burned material is otherwise produced, inasmuch as the rate of heat transfer from the surface to the center of a particle is greater with finer than with coarser particles.

Another disadvantage of the usual rotary kiln processes is that the calcining step and the grinding step must necessarily be separate and distinct, the fine grinding following the calcining.

Bearing in mind the foregoing facts, it is a major object of the present invention to provide a continuous process for the calcining of gypsum wherein overheating and excessive dusting of the gypsum are substantially completely eliminated.

It is another object of the present invention to provide a continuous process for the calcining of gypsum wherein the calcining and a substantial amount of the grinding of the gypsum are accomplished simultaneously.

Still another object of the present invention is to provide a continuous process for the calcining of gypsum wherein the solid gypsum particles are contacted with heated heat-carrying bodies in a rotating kiln, thus eliminating the problems of overheating and excessive dusting of the gypsum.

Yet a further object of the present invention is to provide a process for the calcining of gypsum by means of heated, hard, heat-carrying bodies whereby a substantial amount of grinding of the gypsum occurs simultaneously with the calcining thereof.

These and other objects of the present invention will become clearly understood by referring to the following description, and to the accompanying drawings, in which:

FIGURE 1 is a schematic flow sheet of the process for calcining gypsum;

FIGURE 2 is an axial cross-section, in schematic form, of the process kiln of FIGURE 1; and FIGURE 3 is a schematic flow sheet of a modified form of the process for the calcining of gypsum.

In general, my process for calcining gypsum employs hot metal, such as iron or steel, ceramic heat-carrying bodies, or other suitable heat-resistant and extremely hard materials, which contact and are continuously intermixed with finer sized gypsum in a rotating kiln. All the heat for the calcining process is furnished as sensible heat by the bodies, which are preferably in the form of substantially spherical balls. Because the ball temperature can be closely controlled, the maximum temperature of the gypsum is likewise more readily controlled than by means of gases. Secondly, the temperature difference between the gypsum and the balls need not be large, inasmuch as the heat capacity of the balls is very much greater than the heat capacity of a comparable volume of gases and the rate of heat transfer is extremely high. Therefore, overheating and the consequent production of unreactive plaster may be avoided without the necessity of preliminary removal of the fines.

The temperature difference required between the balls and the gypsum is minimized when the balls flow countercurrently to the gypsum. However, concurrent flow of gypsum and balls may also be used to advantage in some instances.

The action of the balls results in an exceptionally uniform product because, as heat is transferred from the balls to the gypsum, the outer layer of gypsum is calcined and is rubbed off and the uncalcined ore is always exposed so that fresh gypsum is presented to the heated balls.

As mentioned, one of the major advantages of my process lies in the fact that during the calcining of the gypsum, it is ground to a substantially smaller size, thus reducing production costs and initial investment. The sensible heat in the plaster produced during the heat exchange within the rotating kiln is recovered in a second similar heat exchange unit so that the process may be made as economical as possible.

Referring now specifically to FIGURE 1, a counterflow process for the conversion of gypsum to plaster is shown. The raw gypsum, which is first usually coarsely ground to a size of the order of one inch, enters the process kiln 10 along the line 12 and passes in countercurrent contact with substantially hotter heat-carrying balls, which enter the kiln 10 along the line 14. The balls are of a size greater than one inch so that they may be readily separated from the gypsum within the process kiln by any one of a number of suitable screen methods. For example, the kiln disclosed in U.S. Patent No. 2,592,783, issued to Olof Eric August Aspegren, discloses one suitable screening apparatus.

As the kiln is rotated and the feeding is maintained, the two solid materials, the balls and the gypsum, continue to move countercurrently. Inasmuch as the ball temperature is closely controllable, and also because the temperature difference between the gypsum and the balls is not initially as large as would be the case if gases were used as the heating medium, overheating of the gypsum is substantially eliminated. Further, preliminary removal of fines which would otherwise be blown out by hot gases of the prior art processes is unnecessary, since no gases are employed during the calcination.

As mentioned, the action of the hot, hard balls on the gypsum is such that the outer layer of any given gypsum particle is calcined and is rubbed off to expose the uncalcined ore to the heated balls, thereby enabling an exceptionally uniform product to be produced. In addition, the balls exert a substantial grinding action upon the gypsum so that the bulk of the plaster of Paris produced is usually less than −10 mesh material.

After the gypsum has been calcined and ground, the resulting plaster leaves the process kiln 10 along the line 16 to be sent to a heat recuperator 20 which is preferably in the form of a rotating kiln of the type mentioned in the Aspegren patent above referred to. The cooled balls leave the process kiln 10 along the line 22 and counter-currently contact the hot plaster fines, these fines leaving the heat recuperator 20 along the line 22a at a substantially lower temperature than its inlet temperature. The balls are thus partially heated and are sent along the line 23 to a ball heater 24 (which may be of any conventional type) and are then heated to the required temperature to effect calcination in the kiln 10. The heated balls then enter the process kiln 10 along the line 14, as previously described, to complete the cycle of operation.

The water of hydration produced during the calcining steps leaves the process kiln 10 along the line 26 at a high temperature and may be used, along with conventional methods, to reheat the balls. In this case, the water of hydration is condensed in the ball heater 24 to thereby give up its heat of condensation to the balls. Water then leaves the ball heater 24 along the line 28.

A schematic representation of the rotary process or calcination kiln 10 is shown in FIGURE 2 for countercurrent flow of materials. The gypsum enters along pipe 12; the heated balls enter the kiln 10 along the pipe 14 and are intermixed with the gypsum to cause calcining and grinding thereof. The resulting plaster fines leave the kiln along the pipe 16 to be sent to the heat recuperator 20, as previously described. The screen 30 enables the plaster fines to pass therethrough, but prevents the larger balls from passing therethrough also. At the left hand end of the kiln 10, the balls are discharged from the kiln by means of a lifting device which may be of the type shown and described in the Aspegren patent above mentioned. This device consists, in general, of a plurality of spaced fingers affixed to the inner left hand wall of the drum, the fingers scooping the balls up and depositing them into outlet pipe 22.

A specific example of the calcining process is given below:

Gypsum, having a particle size of ¾ of an inch to an inch, enters the process kiln 10 along the line 12 at a temperature of 70° F. and in an amount of 100 pounds per hour. 1¼ inch alumina balls enter the opposite end of the kiln along the line 14 at a temperature of 330° F., and in an amount of 2200 pounds per hour, and countercurrently contact the smaller sized gypsum. The plaster thus produced leaves the process kiln 10 along the line 16 at a temperature of 300° F., and reduced in size such that the majority of the plaster is −10 mesh.

The balls are, of course, reduced in temperature after they impart their heat to the gypsum and leave the process kiln 10 along the line 22 at approximately 100° F., are then sent to the heat recuperator 20 where they countercurrently meet the hotter plaster and are heated thereby to a temperature of approximately 275° F. to be sent to the ball heater 24 for further heating to the desired temperature, which, in this case, is 330° F.

The plaster leaves the heat recuperator 20 along the line 22a at a temperature of approximately 125° F. The product gas (water vapor) leaves the process kiln along the line 26 and passes through the ball heater 24 and is condensed therein after giving up its heat of condensation and some of its sensible heat to the balls. Auxiliary heating means such as the burning of fuel gas may also be employed to heat the balls to the desired temperature.

The calcining of gypsum takes place at a temperature below 330° F., but above 230° F. The temperature difference between the gypsum and the balls is minimized because of the large heat transfer between the balls and the gypsum. The inlet temperature of the balls is approximately 50° F. higher than the calcination temperature, that is to say, from 280° F. to 380° F. Overheating is therefore eliminated. Inasmuch as the overheating is eliminated, the production of unreactive plaster is also avoided. Further, there is no need to remove the fines prior to the retorting, as in the prior art processes that utilize gas media as the heat carrier. The rotary kiln also has the distinct advantage in that the gypsum may be readily ground by the substantially harder ceramic or metal balls to a very small size, thereby eliminating much of the crushing of the plaster usually required after the calcining step.

Concurrent, as opposed to countercurrent, flow of gypsum and balls may also be used to advantage in the ball-type kiln described in FIGURE 2. However, in this case, the temperature of the balls entering the kiln must be higher and/or the rate at which the balls are circulated relative to the gypsum rate must be higher in order to provide the required heat. Nevertheless, overheating of the gypsum by the hot balls can be eliminated to a great extent because the grinding action of the balls in the rotating kiln prevents continuous contact between any given gypsum particle and the hot balls. The gypsum particles themselves serve as heat exchanging bodies, and, when agitated in a rotary kiln, smooth out temperature differences between gypsum particles very rapidly.

Referring specifically now to FIGURE 3, concurrent flow of gypsum and balls is there shown. Gypsum enters the process kiln 100 along the line 112. The balls enter the same end of the kiln 100 along the line 114 and both balls and plaster leave the kiln at the opposite end thereof; the balls and plaster leave the kiln 100 at approximately the same temperature, along the lines 116 and 118, respectively. The balls are then circulated to a ball heater 124 where they are heated by conventional means and are then recycled to the process kiln 100 along the line 114. The gas produced in the process kiln 100, which is the water of hydration of the gypsum, leaves the kiln along the line 120.

As an example of the operating conditions, the gypsum and the balls enter the process kiln 100 at temperatures of 70° F. and 475° F., respectively, and both leave the process kiln at temperatures of 300° F. The ratio of the balls to gypsum is 30:1. The incoming ball temperatures, in general, range from 75° F. to 250° F. above the calcining temperatures.

While several embodiments of my invention have been shown and described herein, it will be apparent to those skilled in the art that many changes and modifications may be made that lie within the scope of the invention. Therefore, I do not intend to be limited by these embodiments, but to be limited only by the appended claims.

I claim:

1. A process for simultaneously calcining and grinding gypsum to produce plaster of Paris, which comprises: continuously contacting and heating particulate gypsum to calcining temperature in solid-to-solid milling contact with hotter, extraneous heat-carrying bodies in a calcining zone, said bodies being harder than the gypsum and furnishing substantially all the heat of calcination; maintaining solid-to-solid milling contact between the gypsum and the heat-carrying bodies in the calcining zone for a period requisite by attrition to reduce the particle size of the gypsum feed and by heat exchange uniformly to heat the gypsum to a predetermined calcining temperature; continuously removing water of hydration from the calcining zone; continuously separating the calcined gypsum product from the heat-carrying bodies; continuously reheating and returning the heat-carrying bodies to the calcining zone; and continuously introducing fresh gypsum to the calcining zone in solid-to-solid contact with the reheated heat-carrying bodies.

2. The process of claim 1 in which an average temperature of between about 230° F. and 330° F. is maintained in the calcining zone.

3. The process of claim 1 in which the heat-carrying bodies and the gypsum are passed through the calcining zone in concurrent flow.

4. The process of claim 1 in which the heat-carrying bodies and the gypsum are passed through the calcining zone in counterconcurrent flow.

5. The process of claim 1 in which the heat contained in the water of hydration removed from the calcining zone is employed in reheating the heat-carrying bodies.

References Cited in the file of this patent

UNITED STATES PATENTS

| | | |
|---|---|---|
| 1,712,082 | Koppers | May 7, 1929 |
| 2,021,671 | Skinner | Nov. 19, 1935 |
| 2,290,805 | Gottschalk et al. | July 21, 1942 |
| 2,420,376 | Johansson | May 13, 1947 |
| 2,767,972 | Badger | Oct. 23, 1956 |